United States Patent [11] 3,616,839

[72] Inventors Nelson E. Burrin
  Fullerton;
  Ralph C. Shelton, Buena Park, both of Calif.
[21] Appl. No. 650,375
[22] Filed June 30, 1967
[45] Patented Nov. 2, 1971
[73] Assignee Swedlow, Inc.
  Garden Grove, Calif.
  Continuation-in-part of application Ser. No. 437,916, Mar. 8, 1965, now abandoned.

[54] GLASS-SILICONE RESIN-STRETCHED ACRYLIC RESIN LAMINATES
  5 Claims, 2 Drawing Figs.
[52] U.S. Cl. .................................................. 161/193,
  156/99, 161/165, 161/208
[51] Int. Cl. ...................................................... B32b 17/06

[50] Field of Search ........................................... 161/165,
  193, 208; 156/106, 99

[56] References Cited
UNITED STATES PATENTS

| | | | |
|---|---|---|---|
| 3,160,551 | 12/1964 | Buetow et al. ................ | 161/208 |
| 3,312,587 | 4/1967 | Wilson .......................... | 161/193 |
| 3,261,739 | 7/1966 | Porter .......................... | 161/193 |
| 3,310,458 | 3/1963 | Mattimoe et al. ............. | 161/193 |
| 3,388,035 | 6/1968 | Mattimoe et al. ............. | 161/193 |

Primary Examiner—William J. Van Balen
Attorney—Lyon and Lyon

ABSTRACT: Transparent laminates comprising at least one external glass sheet and at least one stretched acrylic plastic sheet which are bonded together by a nonrigid, deformable silicone resin interlayer to prevent the difference in the coefficient of thermal expansion between glass and stretched acrylic plastic from causing undesirable structural properties.

NELSON E. BURRIN
RALPH C. SHELTON
INVENTORS.

BY Lyon+Lyon
ATTORNEYS 3,616,839

GLASS-SILICONE RESIN-STRETCHED ACRYLIC RESIN LAMINATES

This application is a continuation-in-part of Ser. No. 437,916, filed Mar. 8, 1965 now abandoned, the disclosure of which is expressly incorporated herein by reference.

BACKGROUND OF INVENTION

It has long been recognized that it would be desirable to construct transparent laminates from glass and stretched acrylic plastic sheets such that an external glass sheet could function to provide maximum abrasion resistance and the plastic sheet could function as the load-bearing member. Stretched acrylic polymers are preferred for use in such laminates and have been considered particularly desirable by aircraft manufacturers for use as windows and the like.

However, the temperature conditions to which such laminates are subjected in use, particularly when used in aircraft, cover a wide range of temperatures, e.g., −65° F. to +200° F. and higher. Thus differences in coefficient of thermal expansion between the sheets which comprise the laminate becomes highly important since a large difference will result in failure of the laminate unless means for preventing such failure are present. Because of the significant difference between the coefficient of thermal expansion of glass and that of plastic materials generally used to prepare transparent laminates, prior art workers have been restricted to the use of glass-to-glass structures or plastic-to-plastic structures such as those disclosed in U.S. Pat. No. 3,135,645. For this reason, it has not previously been possible to produce a laminate structure having one surface which has the high abrasion resistance of glass in combination with another surface having the strength characteristics of a rigid plastic sheet.

The present invention makes it possible to form laminates from sheets having substantially dissimilar coefficients of thermal expansion which are capable of withstanding the shear stresses caused by this dissimilarity when such laminates are exposed to different temperatures without fracture or delamination. More specifically, this invention makes possible the combination of glass surfaces which provide an excellent base for electrically conductive coatings which may be used for deicing or defogging with stretched acrylic plastic sheets such as oriented acrylics which, in addition to strength properties, provide excellent optical quality and permit substantial weight decreases without sacrifice in strength into an article which possesses great structural integrity when subjected to substantial temperature changes.

SUMMARY OF THE INVENTION

Broadly, the laminates of the present invention comprise substantially rigid skins of glass and stretched acrylic adhered together in spaced-apart relation by means of at least one layer of tough, substantially nonrigid deformable silicone resins. Preferably, these laminates are prepared by casting a layer of tough, substantially nonrigid, deformable silicone resin between the above-mentioned spaced-apart, tough, hard, substantially rigid skins.

It is a primary object of the present invention to provide laminates made from glass and stretched acrylic sheets having dissimilar coefficients of thermal expansion which laminates are capable of withstanding widely varying temperature conditions without failure.

It is another object of the present invention to provide laminates comprising a silicone interlayer which does not become rigid at extremely low temperatures.

It is another object of the present invention to provide laminates comprising glass and stretched acrylic having highly dissimilar coefficients of thermal expansion in combination with a silicone resin interlayer.

Other objects and advantages of the present invention, it is believed, will become apparent from the following detailed description of specific embodiments thereof.

DESCRIPTION OF PREFERRED EMBODIMENTS

Figure 1:
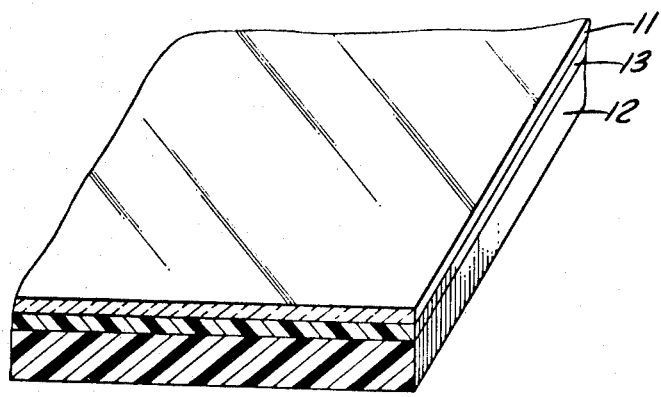
FIG. 1 is a perspective cross-sectional view of a laminate of the present invention wherein one outer skin comprises glass and the other outer skin comprises a stretched acrylic plastic.

In FIG. 1, outer skins 11 and 12 are illustrated as being bonded together by an intermediate layer 13. Skin 11 is glass and skin 12 is a rigid stretched acrylic plastic as contrasted with intermediate layer 13 which is a flexible silicone resin.

Figure 2:
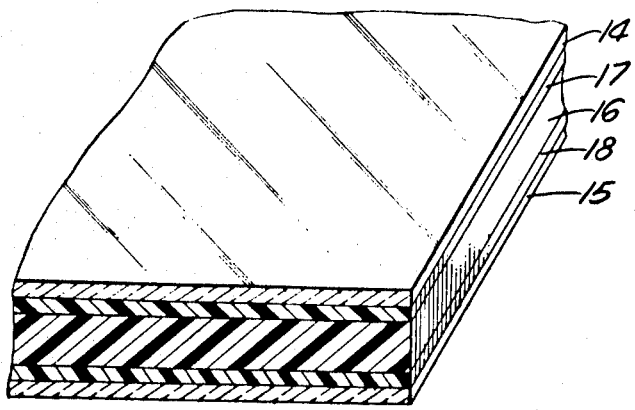
FIG. 2 is a perspective cross-sectional view of a laminate of another embodiment of the present invention wherein both outer skins comprise glass and are combined with an inner skin comprising a stretched acrylic plastic.

In FIG. 2, outer skins 14 and 15 are bonded to an internal structural member 16 by interlayers 17 and 18. In this embodiment, outer skins 14 and 15 comprise glass while internal structural member 16 comprises a rigid stretched acrylic material. Interlayers 17 and 18 comprise a flexible silicone resin.

The stretched acrylic plastic material which is used as a skin 12 or an internal structural member 16 is a tough, hard, substantially rigid composition which is capable of being machined or molded in order to provide a desired shape to the laminate. Furthermore, the stretched acrylic is uniquely adapted to forming a tenacious bond to the flexible silicone resin which will be cast between at least two skins to form a laminate.

The stretched acrylic plastic materials may be any of the known rigid, resinous compositions familiar to those skilled in the art of aircraft glazing, such as stretched polymethylmethacrylate.

The material which comprises interlayers 13, 17 and 18 is a flexible silicone resin. Such resins may generally be cured at room temperatures. The silicone resins contemplated for use in the present invention must be capable of curing to a tough, nonrigid, deformable, resinous layer and must readily adhere to the glass and stretched acrylic. These silicone resins may require the addition of catalysts for curing or may be cured upon exposure to the atmosphere.

In general, the silicone resins preferred for use in the present invention are room temperature curing silicone resins which are pourable at room temperature, which are transparent and which cure in the absence of the atmosphere upon the addition of catalyst and are based on one of two types of chemistry, but have certain features in common. These materials generally are free of filler and generally consist substantially of organosilicon materials with only a minor amount of catalyst. One type of such silicone resins uses as a cure mechanism the addition of an SiH linkage of one organopolysiloxane molecule across the double bonds of olefinically unsaturated radicals attached to another organopolysiloxane molecule. One illustration of this type of reaction is found in example 26 of U.S. Pat. No. 2,823,218, which patent is incorporated by reference herein, wherein the SiH groups of a methyl-hydrogen siloxane homopolymer are added across the vinyl groups of a dimethylsiloxane-methylvinylsiloxane copolymer. In this patent an isopropanol solution of chloroplatinic acid is used as a catalyst for the reaction. Elemental platinum is disclosed as a suitable catalyst for similar reactions in U.S. Pat. No. 2,970,150, which patent is incorporated by reference herein. In a second type of curing system, the condensation of silicon-bonded hydroxyl groups is relied upon to effect conversion of the liquid organopolysiloxane to the solid form. In general, this condensation is catalyzed by either acidic or basic catalysts depending upon the particular system employed. Such a curing system is disclosed in U.S. Pat. No. 2,843,555, which is incorporated by reference herein, wherein the curing agents are metallic salts of organic carboxylic acids. Another illustration of the same type of curing system is disclosed in French Pat. No. 1,320,767, which is incorporated by reference herein, and which describes the use of various metal salts as well as basic materials such as quaternary ammonium and quaternary phosphonium compounds, as well as catalysts systems which comprise both an amine, such as dimethylsoya amine and an epoxy compound such as phenyl glycidyl ether.

All of the room temperature curing silicone systems contemplated for use in the present invention are characterized by viscosities in the range of several thousand centipoise where the material is readily pourable. These compositions cure to the solid, tough, nonrigid, deformable, elastic, state at room temperature or moderately above, subsequent to the addition of catalysts. Other patents which disclose various types of room temperature curing silicone resins include U.S. Pat. Nos. 2,894,930, 2,915,497 and 3,020,260, as well as Belgian Pat. No. 614,771, all of which are incorporated by reference herein. Commercially available silicone resins of the type suitable for use in the present invention are RTV-602, RTV-603 and RTV-615 marketed by General Electric Company and Sylgard 182 and 184 marketed by Dow-Corning Corporation.

Another resin for use in this invention is a polymer system in the class of SiH-olefin curing silicones. The basic feature of this system is the use of two different silicone polymers in which the average molecule of each polymer contains either a silicon-bonded hydrogen or a silicon-bonded olefinically unsaturated radical. In the mixture of materials one polymer has a silicon-bonded olefinically unsaturated group and in one polymer the average molecule contains silicon-bonded hydrogen atoms. Generally, the number of silicon-bonded olefinically unsaturated groups is about equal to the number of silicon-bonded hydrogen atoms. In this case, the polymers involved are methylvinylpolysiloxanes and methyl hydrogen polysiloxanes and the catalyst is a compound of platinum.

The laminates of the present invention will include at least three components including at least two outer skins, one glass and one stretched acrylic, and at least one intermediate silicone resin layer. In addition, a multiplicity of plies may be used to provide desired properties. The exterior skins may be of any desired thickness and may be as thin as one sixty-fourth inch or as thick as one-half inch or more. As shown in FIGS. 1 and 2, the stretched acrylic skin or internal structural member will generally be somewhat thicker than the glass skin, but certain uses may make different relationships desirable. The thickness of the silicone resin intermediate layer is of substantial importance and this layer must be thicker than a mere adhesive. For example, the intermediate silicone layer should be at least one sixty-fourth inch thick in order to withstand stresses created by changes in the temperature to which the laminate is exposed and may be as thick as three-fourths of an inch. Preferably, the silicone resin interlayer will be from one-sixteenth inch to one-fourth inch thick.

The laminates of this invention may be prepared by fabricating the skins in any known manner. For example, skins may be shaped from previously prepared materials such as various resins and glass by heating them and shaping them to a form. Such skins may also be prepared by molding in a customary mold at customary molding temperatures. In preparing the laminates, the prepared skins are held in spaced-apart relationship by means of various spacers or gaskets which maintain a cavity between the skins which is substantially equivalent in depth to the desired thickness of the silicone resin interlayer. The spacers should be inert to the silicone resin interlayer material and may be made from materials such as plastic coated metal, polytetrafluoroethylene, etc. Thereafter, the silicone resin may be poured or forced into the cavity between the skins after which the laminate assembly is sealed and cured.

The conditions of curing, e.g., time, temperature and pressure are known in the art and will depend on the silicone resins being cured. Generally, the temperature will be from room temperature to moderately above, the time from a few minutes to several hours and the pressure will range from atmospheric to 25 p.s.i. or more.

The present invention is further illustrated by the following examples:

EXAMPLE I

A 12 inch × 12 inch flat panel laminate was made in the following manner to produce a composite structure comprising a 0.250 inch tempered soda lime glass sheet of the type normally used as structural elements in laminated glass windshield application for aircraft transparencies, a 0.125 inch Sylgard 182 silicone resin (a two-component pourable polymer) interlayer, and a 0.450 inch sheet of stretched acrylic resin (Swedlow 350). The glass and acrylic sheets were cleaned. The glass sheet was mounted to a flat vacuum tooling plate of approximately the same size as the stretched acrylic sheet. The acrylic sheet was backed with tempered soda lime glass sheet to support the acrylic sheet during the subsequent casting and curing operation and to prevent contamination or deformation of the outer optical surface of the acrylic sheet. An internal tubing, elastomeric gasket and solid shim were used about the periphery of the glass and acrylic sheets to construct a casting volume comprising about 0.125 inch thickness and the entire assembly was held together by means of C-clamps. The assembly was placed in a vertical position with an unsealed area at the top. Thereafter, the interlayer casting resin was prepared by mixing the silicone resin with 11 phr. of Sylgard 182 curing agent. Entrapped air was removed from the mixture by applying 25 inches of vacuum and maintaining the vacuum until all bubbles collapsed. This air-free mixture was poured into the panel assembly and was allowed to stand vertically until all entrapped air had migrated to the surface and escaped. The assembly was placed in a circulating air oven at 180° F. for a period of 4 hours. Thereafter, the laminate assembly was allowed to cool and removed from the oven, the clamps removed and the transparent panel tested. The finished panel was transparent and displayed excellent optical qualities with no distortion and the panel contained no observable imperfections. The glass-stretched acrylic laminate was soaked for 4 hours at both −65° F. and 180° F. with no observable detrimental effect, such as warpage, haze, delamination, or optical distortion.

EXAMPLE II

The general procedure outlined in example I was used to fabricate another 12 inch × 12 inch flat panel. In this case, the glass face was one-eighth inch electrically conductive coated Pyrex glass and the interlayer casting resin was a mixture of 350 grams of RTV-602 silicone resin and 1.75 SRC-05 catalyst.

After mixing, the catalyzed resin was thoroughly evacuated to remove air before casting into the panel assembly. The entire assembly was cured for 24 hours at room temperature and then 24 hours at 150° F. The flat panel exhibited the same type of optical excellence as that of example I with an overall light transmittance of 83 percent. The electrically conductive coating at the inner glass surface maintained essentially the same resistance and demonstrated adequate deicing characteristics as a result of powering the coating when the panel had been cold soaked for 4 hours at −65° F. Temperature cycling from 4 hours at −65° F. to 4 hours at 175° F. indicated no detrimental effect to the composite structure.

EXAMPLE III

The procedure of example I was repeated using an interlayer silicone casting resin of RTV-602 and 0.25 parts per hundred of catalyst SRC-05. Both double strength window glass and 0.250 inch plate glass were laminated with 0.675 inch stretched Plexiglas (polymethylmethacrylate) in the 12 inch × 12 inch configuration to yield transparent laminates of good optical quality. The panel with double strength window glass face exhibited an overall light transmittance of 89 percent, while the panel with annealed plate glass face had a light transmittance of about 85 percent.

EXAMPLE IV

A full scale windshield was prepared using the foregoing procedures. The outer windshield glass face was 0.125 inch Pyrex with an electrically conductive coating and the stretched acrylic member was 0.750 inch thick. The interlayer casting resin was about 280 grams of RTV-602 mixed with 7 grams of SRC-05 catalyst and filled a casting volume having a thickness of about 0.187 inch. Curing was accomplished maintaining the assembly for 16 hours at room temperature and for 6 hours at 160° F. in a circulating air oven. The large windshield displayed the same desirable optical properties indicated in the examples I-III. The flat transparent laminate was exposed to soaking temperature of −65° F. and 175° F. for several cycles without detrimental effects of warpage or delamination. The electrically conductive coating was powered after the windshield had been soaked at −65° F. temperature for 2 hours and exhibited a satisfactory deicing operation.

The panel assembly was again returned to several cycles of −65° F. and 175° F. temperature soaking with no impairment of the electrical system or the optical quality.

EXAMPLE V

Another test panel of the same windshield configuration was constructed according to the procedure and transparent elements of example IV. After curing, the finished laminate displayed the same excellent optical quality and optical transmission properties of the previous windshield panel. A special check fixture was used to obtain deflection data at conditions of environmental testing to evaluate the quantitative deflection characteristics. Excellent laminate stability was demonstrated for this comparatively large configuration of stretched Swedlow 350 and electrically coated glass composite at both −65° F. and 175° F. soak conditions. While minor deflection was observed as a result of the differential coefficients of expansion for the two glazing materials, some effect was expected because of the lack of edge restraint on structural leading effect. The stretched Swedlow 350 member showed very little flatness deviation as measured across the diagonal dimensions. The center deflected a maximum of 0.030 inch at −65° F. and returned to zero deflection at room temperature condition. The deflection observed at the glass face was almost negligible for both the −65° F. and 175° F. soak conditions. The effectiveness of the cast interlayer is evident in that the relative movement of the acrylic structural member with thermal cycling is not transferred to the glass face thereby preventing significant deflection, stress, or failure. At the same time, no visible effects of delamination, voids, color or opacity was observed and the transparent laminate retained very good optical quality.

It will be readily apparent to those skilled in the art that the present invention makes possible the production of glass-stretched acrylic laminates having thermal cycle properties unknown to the prior art. Laminates produced according to the present invention having a silicone resin interlayer have been subjected to thermal soak and shock cycles of −90° F. to 175° F. without noticeable deflection and with no delamination. In marked contrast, glass-stretched acrylic laminates comprising polyvinyl-butyral or other previously suggested interlayer materials have exhibited glass fracture or delamination when subjected to even less severe temperature conditions.

Thus, the present invention is of particular advantage with regard to the production of aircraft windshields and transparencies generally since glass outer surfaces provide maximum resistance to abrasion and are excellent substrates for electrically conductive coatings which may function as deicing or defogging means and since resin sheets such as oriented acrylic sheets possess fracture propagation resistance (toughness) not obtainable with glass. In addition, oriented acrylics possess excellent optical quality and result in weight savings when used in place of glass. In this regard, it has been found that test windshields comprising laminates of the present invention have performed quite successfully in bird-impact testing. In such testing, 4 pound chickens were fired from specially constructed guns using compressed air as the propellant at the windshields. It was found that the chickens could be fired at the windshields at speeds in excess of 435 m.p.h. without failure of the stretched acrylic sheet and with only cracking of the outer glass sheet. Bird-impact resistance may, of course, be increased by increasing the thickness of the stretched acrylic member.

Having fully described the present invention, it is to be understood that it is not to be limited to the details set forth, but is of the full scope of the appended claims.

We claim:

1. A laminate comprising a first skin comprising a glass sheet and a second skin comprising a tough, hard substantially rigid stretched acrylic resin and a silicone resin interlayer provided between said skins and bonded to each of said skins, said interlayer being nonrigid, deformable and flexible.

2. The laminate of claim 1 wherein each of said skins and said interlayer are transparent.

3. The laminate of claim 1 wherein said silicone resin interlayer material is curable and pourable at room temperature.

4. The laminate of claim 1 wherein said silicone resin interlayer material is catalytically curable.

5. The laminate of claim 1 wherein said silicone resin interlayer comprises methylvinylpolysiloxane and methyl hydrogen polysiloxane.